(12) United States Patent
Roche et al.

(10) Patent No.: US 7,357,827 B2
(45) Date of Patent: Apr. 15, 2008

(54) INTEGRATED AMMONIACAL SOLVENT EXTRACTION AND HYDROGEN REDUCTION OF NICKEL

(75) Inventors: Eric Girvan Roche, Booragul (AU); Philip E. Grazier, Kilaben Bay (AU)

(73) Assignee: QNI Technology Pty. Ltd., Queensland (AU)

( * ) Notice: Subject to any disclaimer, the term of this patent is extended or adjusted under 35 U.S.C. 154(b) by 335 days.

(21) Appl. No.: 10/854,802

(22) Filed: May 27, 2004

(65) Prior Publication Data

US 2005/0211022 A1 Sep. 29, 2005

Related U.S. Application Data

(63) Continuation of application No. PCT/AU02/01615, filed on Nov. 28, 2002.

(30) Foreign Application Priority Data

Nov. 29, 2001 (AU) .................................. PR9177

(51) Int. Cl.
*C22B 23/00* (2006.01)
(52) U.S. Cl. ........................................ 75/717; 423/139
(58) Field of Classification Search .................. 75/717; 423/139
See application file for complete search history.

(56) References Cited

U.S. PATENT DOCUMENTS

| 3,816,098 A | 6/1974 | Mackiw et al. |
| 3,846,117 A * | 11/1974 | Gandon et al. ............... 75/365 |
| 4,148,632 A | 4/1979 | Seibt et al. |
| 4,328,192 A | 5/1982 | Tolley et al. |
| 4,758,266 A | 7/1988 | Chou |
| 5,174,812 A | 12/1992 | Price |
| 5,584,908 A | 12/1996 | Scheie |

FOREIGN PATENT DOCUMENTS

WO  WO 96/14953  5/1996

OTHER PUBLICATIONS

Kunda et al "Low Density Nickel Powder by Hydrogen Reduction from the Aqueous Ammonium Carbonate System", pp. 153-171, Planseeberichte fur Pulvermetallurgie.
Kunda et al, "Effect of Addition Agents on the Properties of Nickel Powders Produced by Hydrogen Reduction" vol. 1, pp. 15-19, Modern Developments in Powder Metallurgy, vol. 1, Fundamentals and Methods 1966.

* cited by examiner

*Primary Examiner*—Steven Bos
(74) *Attorney, Agent, or Firm*—B. Aaron Schulman; Stites & Harbison PLLC

(57) ABSTRACT

A process is provided for the recovery of a metallic nickel product in a solvent extraction process which includes the steps of forming a nickel ammine complex by stripping nickel from a nickel loaded organic phase with a high strength ammonia solution and then reducing the nickel ammine complex with hydrogen from the high strength ammonia solution to produce a metallic nickel product. By virtue of the present process, a reductive precipitation of nickel by hydrogen is obtained so as to recover a metallic nickel product, and the process is advantageous in that it will allow for commercial processes wherein nickel may be recovered by hydrogen reduction based on high strength ammonia solutions.

20 Claims, 2 Drawing Sheets

INTEGRATED AMMONIACAL SOLVENT EXTRACTION AND HYDROGEN REDUCTION OF NICKEL

RELATED APPLICATION

Figure 2:
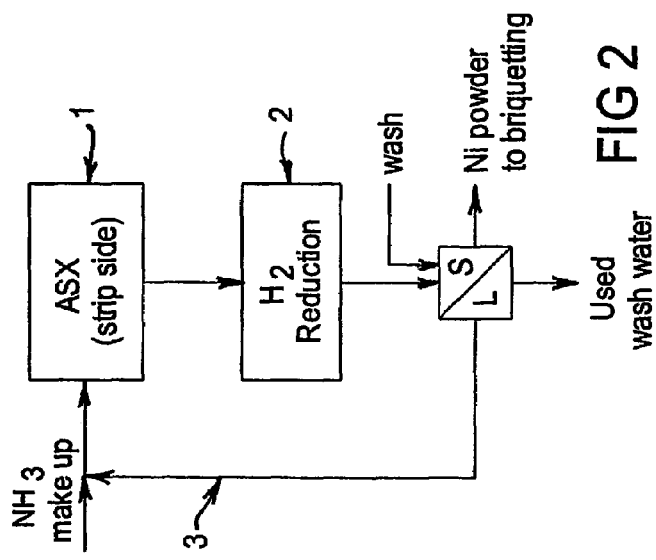

This application is a continuation of International Application No. PCT/AU02/01615, filed Nov. 28, 2002.

INTRODUCTION

The present invention resides in a process for the reductive precipitation of nickel by hydrogen to recover a metallic nickel product. More specifically, the invention resides in the integration of reductive precipitation of nickel by hydrogen from a nickel ammine complex in a high strength ammonia solution recovered from a solvent extraction process. In a preferred form, the process involves the hydrogen reduction of a nickel ammine carbonate or nickel ammine sulphate complex in a high strength ammonia solution to produce a metallic nickel product and ammonium carbonate or sulphate.

BACKGROUND OF THE INVENTION

Reductive precipitation of metal ions from solution by hydrogen is an electrochemical process that has been practised commercially in nickel recovery for many years. Variants of the method have been described by Sherritt Gordon Mines and Amax. In commercial processes, nickel is readily recovered from a nickel sulphate complex by hydrogen reduction, for example in the reaction:

By this reaction, hydrogen ions are released and unless they are neutralised, the pH will decrease, inhibiting further reaction. Neutralisation of the hydrogen ions may be achieved by the addition of ammonia, which combines with the nickel sulphate to form a nickel ammine sulphate complex. This nickel ammine sulphate complex may be reduced by hydrogen, and in the case of nickel diammine sulphate, the product formed will be a nickel product and ammonium sulphate, as shown by the equation:

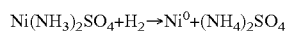

The process embodied by this equation will take place at a constant pH and therefore does not suffer the inhibition of further reaction which can occur without neutralisation.

Although favourable thermodynamics exist for nickel to be reduced by hydrogen at room temperature, in practice, elevated temperatures and pressures are required to achieve favourable kinetics. Metal complexes such as the ammines of nickel decrease in stability with increasing temperature and often hydrolysis results in precipitation of salts and hydroxides. This problem is minimised by the presence of high concentrations of non-reactive salts such as ammonium sulphate.

Therefore, commercial systems operate with an $NH_3$:Ni ratio of 2:1 in the presence of high strength ammonium sulphate at elevated temperatures and pressures to achieve favourable kinetics, while minimising the precipitation of salts and hydroxides. As illustrated above, ammonium sulphate is a by-product of the reaction, which must be bled off and recovered for economic reasons.

By application of the Nernst equation, it can be shown that the potential of the hydrogen reduction system is a function of the pH of the solution and the activity of the gaseous hydrogen dissolved in the solution. This may be demonstrated as follows:

At 25° C. $E = 0.0591$ pH $- 0.0296 \log P_{H2}$

In the case of a nickel sulphate solution in which nickel ions have a molal activity of $1 \times 10^{-4}$ in conjunction with a $P_{H2}$ of one atmosphere, we find:

$$pH = \frac{0.368}{0.059} = 6.2$$

This is the equilibrium pH and in this example, at pH values of greater than 6.2, there would be a thermodynamic tendency for the nickel complex to be reduced from a solution of nickel having $1 \times 10^{-4}$ molal activity.

Existing aqueous hydrogen reduction processes for nickel are based on the use of ammonium sulphate liquors as outlined above. Processes have been described in the literature for hydrogen reduction of nickel from basic nickel carbonate slurries in ammonium sulphate solution which was briefly used commercially in the Phillipines, and also hydrogen reduction of nickel hydroxide slurries in ammonium sulphate solutions (T Saarinen et.al. "Pressure reduction of nickel by hydrogen from hydroxide slurries", Hydrometallurgy 43 (1996) and International patent WO 01/348959, May 2001.

An alternative process to recover a metallic nickel product from nickel ammine carbonate solutions at similar ratios of ammonia to nickel in a similar manner to the recovery from the ammonium sulphate system above, has been described by W. Kunda et. al "Low density nickel powder by hydrogen reduction from the Aqueous Ammonium Carbonate system" Planseeberichte Fur Pulvermetallurgie, 1964.

However, there are no known commercial processes where nickel is recovered by hydrogen reduction based on high strength ammonia solutions particularly strongly ammoniacal ammonium carbonate or strongly ammoniacal ammonium sulphate solutions.

Australian Patent AU 605867 in the name of Queensland Nickel Pty Ltd (AU 605867), the entire disclosure of which is incorporated herein by reference, describes a process for the recovery of nickel in an ammoniacal solvent extraction (ASX) system. In the process described in this patent, nickel is extracted from an ammoniacal liquor with an organic reagent to create a nickel loaded organic phase, and is then stripped from the nickel loaded organic phase with a strongly ammoniacal ammonium carbonate solution leading to the formation of a nickel ammine carbonate complex. The nickel is recovered from this complex by known art.

The above discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed in Australia before the priority date of each claim of this application.

An aim of the present invention is to demonstrate a process by which nickel, which has been extracted from an ammoniacal liquor with an organic reagent to create a nickel loaded organic phase and then stripped from the nickel loaded organic phase with a high strength ammonia solution, can be recovered from the high strength ammonia solution by hydrogen reduction. The invention is particularly applicable to a process wherein the high strength ammonia solution is a strongly ammoniacal ammonium sulphate solution leading to the formation of nickel ammine sulphate complexes in solution, or a strongly ammoniacal ammonium carbonate solution leading to the formation of nickel ammine carbonate complexes in solution. The strongly ammoniacal ammonium sulphate solution may be used in a similar manner to the ammoniacal ammonium carbonate solution used to strip nickel from the loaded organic phase in the process described in Australian patent AU605867 discussed above.

A further aim of the present invention is to demonstrate a process which integrates hydrogen reduction of nickel ammine carbonate complexes in nickel solvent extraction process solutions such as that described in AU 605867.

A further aim of the invention is to demonstrate a process which integrates hydrogen reduction of nickel ammine sulphate complexes in nickel solvent extraction solutions produced by stripping from the nickel loaded organic phase with a strongly ammoniacal ammonium sulphate solution.

A further aim of the invention is to demonstrate a process for hydrogen reduction of nickel ammine carbonate complexes in strongly ammoniacal ammonium carbonate solutions.

A further aim of the invention is to demonstrate a process for hydrogen reduction of nickel ammine sulphate complexes in strongly ammoniacal ammonium sulfate solutions.

SUMMARY OF THE INVENTION

Accordingly, the present invention resides in the process for the recovery of a metallic nickel product in a solvent extraction process including the steps of:
(a) forming a nickel ammine complex by stripping nickel from a nickel loaded organic phase with a high strength ammonia solution; and
(b) reducing the nickel ammine complex with hydrogen from the high strength ammonia solution to produce a metallic nickel product.

In a preferred embodiment, the present invention resides in a process for the recovery of a metallic nickel product from a nickel ammine carbonate complex in a high strength ammoniacal ammonium carbonate solution including the step of reducing the nickel ammine carbonate complex by hydrogen to produce a metallic nickel product.

In yet a further preferred embodiment, the present invention resides in a process for the recovery of a metallic nickel product from a nickel ammine sulphate complex in a high strength ammoniacal ammonium sulphate solution including the step of reducing the nickel ammine sulphate complex by hydrogen to produce a metallic nickel product.

Ammonia carbonate is a by-product produced by the hydrogen reduction process when a high strength ammoniacal ammonium carbonate solution is used. The process is particularly applicable to high strength ammoniacal ammonium carbonate solutions and preferably, the molar ratio of ammonia to nickel in the solution is greater than 8:1.

Ammonium sulphate is a by-product of the hydrogen reduction process when a high strength ammoniacal ammonium sulphate solution is used. Preferably, the molar ratio of ammonia to nickel when a high strength ammoniacal ammonium sulphate solution is used is greater than 6:1.

DESCRIPTION OF THE INVENTION

In one form of the invention, the hydrogen reduction process is integrated with a nickel solvent extraction process as described in AU 605867. This nickel solvent extraction process described in AU 605867, involves the extraction of nickel from an ammoniacal ammonium carbonate liquor containing nickel(II) ions with an organic reagent to form a nickel loaded organic phase. The nickel loaded organic phase is subsequently stripped with an ammoniacal ammonium carbonate solution to form the nickel ammine carbonate complex in solution as an intermediary product, prior to the recovery of nickel. Typically, the concentrated ammoniacal ammonium carbonate solution used to strip the organic phase, has an ammonia concentration of about 210-300 g/L, preferably 260 g/L, and a carbon dioxide concentration of about 50-300 g/L, preferably 220 g/L, and contains about 50-90 g/L nickel as the hexammine complex once the nickel has been stripped form the organic phase.

In the process described in the present invention it has been found that nickel may be recovered by hydrogen reduction of the nickel ammine carbonate complex formed in the ammoniacal ammonium carbonate solution recovered from a solvent extraction process.

In the process of the present invention, the ammonia concentration in the concentrated ammoniacal ammonium carbonate solution used to strip the organic phase has an ammonia concentration of about 210 to 300 g/L and a carbon dioxide concentration of about 50 to 300 g/L, that is having a similar concentration to that currently used in the process described in AU 605867. The preferred ammonia concentration is generally about 260 g/L while the preferred carbon dioxide concentration is slightly less than that which is described in AU 605876 and is about 50 to 150 g/L. It is preferred that the nickel concentration in the present process in the concentrated ammoniacal ammonium carbonate solution is about 50 to 90 g/L nickel as the nickel carbonate hexammine complex.

Typically, the organic reagent used in the solvent extraction process to extract the nickel ions from the ammoniacal ammonium carbonate liquor is selected from the group 2-hydroxy-5-t-nonyl acetophenoneoxime, 2-hydroxy-5-t-nonyl salicylaldoxime and alkyl, aryl and halide substituted beta diketone types. Most preferably, the organic reagent is a 2-hydroxy-5-t-nonyl acetophenoneoxime modified by an alcohol, in an aliphatic or aromatic kerosene type carrier or a combination of both. Extraction of nickel with the organic reagent creates a nickel loaded organic phase.

When the nickel is stripped from the nickel loaded organic phase with an ammoniacal ammonium carbonate solution, it forms a nickel ammine carbonate complex. The nickel will tend to form the hexammine complex due to the high concentration of ammonia. It has now been found that hydrogen reduction of the nickel complex can be integrated into the solvent extraction process to recover the nickel. The process involving the nickel carbonate hexammine complex may be summarised by the following reaction:

$$Ni(NH_3)_6CO_3 + H_2 \rightarrow Ni^0 + (NH_4)_2CO_3 + 4NH_3$$

The reaction process as indicated above has been found to provide particular advantages when integrated into the solvent extraction process as referred to above.

A significant feature of the invention is that it differs from the prior art in that the ratio of ammonia to nickel in the nickel ammine carbonate complex subjected to hydrogen reduction in this case, without limit, exceeds 8:1. The highest ratio of ammonia to nickel used in prior the art is below this level with commercial practice having a ratio of ammonia to nickel of about 2:1.

Notably, the ammonium carbonate reaction product generated following hydrogen reduction of the nickel complex may be used directly (or with added ammonia) to strip nickel from the nickel loaded organic phase in the solvent extraction system as outlined above.

A further advantage of the process of the present application is that there is no hydrogen ion product produced, thereby maintaining the pH of the reaction in a region whereby inhibition of the reaction will not occur.

In another form of the invention, the nickel loaded organic phase is stripped with a high strength ammoniacal ammonium sulphate solution rather than a high strength ammoniacal ammonium carbonate solution. In this embodiment of the invention, the nickel is recovered by hydrogen reduction of the resultant nickel ammine sulphate complex formed in the high strength ammoniacal ammonium sulphate solution.

The nickel, in this embodiment of the invention, will also tend to form the hexammine complex due to the high concentration of ammonia. It has now been found that hydrogen reduction of the nickel complex can be integrated into the solvent extraction process to recover the nickel. The process involving the nickel sulphate hexammine complex may be summarised by the following reaction:

$$Ni(NH_3)_6SO_4 + H_2 \rightarrow Ni^0 + (NH_4)_2SO_4 + 4NH_3$$

The reaction process has been found to be particularly suitable when integrated into a solvent extraction process such as that described in AU 605867.

In the prior art and existing practices, the nickel ammine sulphate solution that may be subjected to a hydrogen reduction process has an ammonia to nickel molar ratio of typically 2-3:1. The process of this embodiment of the invention has established that a higher ratio of ammonia to nickel without limit, exceeding 6:1 can be successfully used.

The ammonium sulphate generated following hydrogen reduction of the nickel complex may be used directly (or with added ammonia) to strip the nickel from the nickel loaded organic phase, as described above in a similar manner to which the ammonium carbonate could be used.

Again, there is no hydrogen ion produced, thereby maintaining the pH of the reaction.

The ammoniacal ammonium sulphate solution preferably has a total ammonia concentration of 160 to 300 g/L and a total sulphate concentration of 50 to 180 g/L. Most preferably the total ammonia concentration is about 160 to 200 g/L and the total sulphate concentration is 70 to 160 g/L. The nickel concentration in the high strength ammoniacal ammonium sulphate solution after the nickel has been stripped from the organic phase is preferably about 30 to 60 g/L nickel as the nickel sulphate hexammine complex.

In developing the process of this invention, studies were undertaken to identify through both theoretical and practical aspects, conditions that would enable the recovery of metallic nickel from ammonium carbonate or sulphate solutions by hydrogen reduction. Additionally, the studies included the addition of other anions to the solution while maintaining the high pH regime.

Ammine complexes are readily formed by nickel with increased stability over the aquated ion and at the same time the potential is shifted to more negative values (calculated by use of the Nernst equation), thus increasing the equilibrium pH. This is illustrated in Table 1.

These studies demonstrate that favourable conditions could be achieved in order to reduce nickel by hydrogen when nickel is present as a mono ammine complex through to the hexammine complex.

DESCRIPTION OF THE ATTACHED FIGURES

Figure 1:
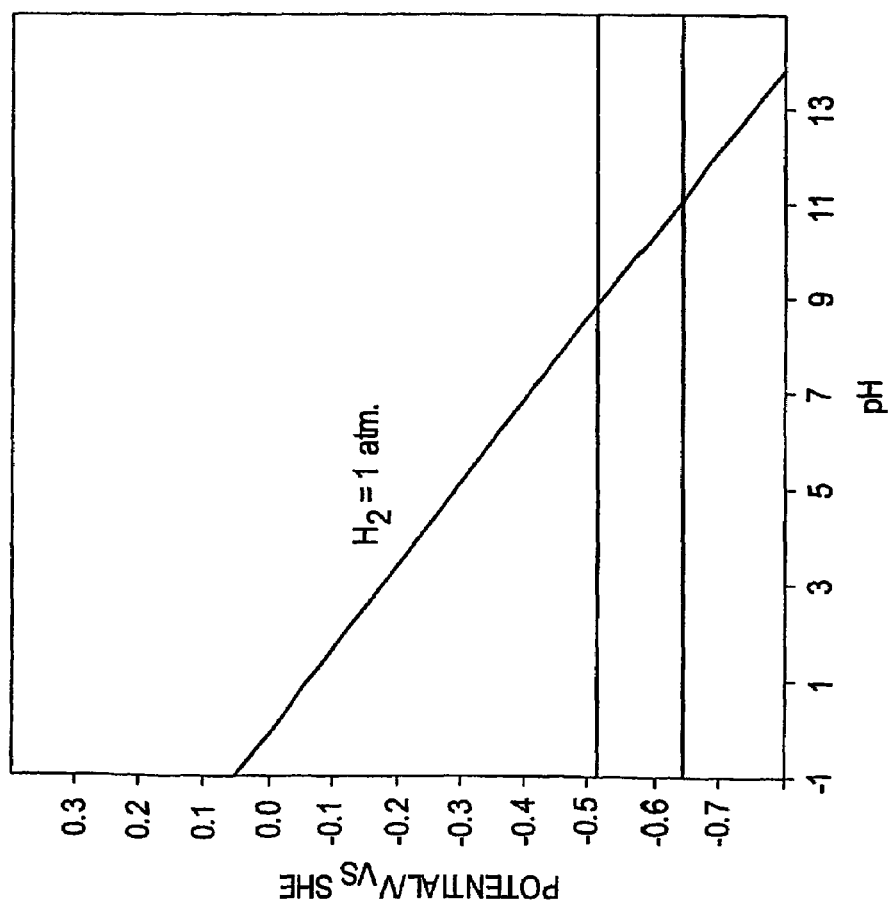

The relationship between potential and pH for a given metal system can be illustrated by a modified E/pH (Pourbaix) diagram (FIG. 1). The potential corresponding to nickel ion activities for 1.5, molal and $10^{-4}$ molal as the $Ni(NH_3)_6^{2+}$ complex are shown as horizontal lines independent of pH and extended to intersect the hydrogen line. The equilibrium pH value for each specific nickel ion activity can be obtained from the pH axis.

From this diagram it is apparent that nickel present as the hexammine complex at a molal activity of 1.5, in strong ammoniacal ammonium carbonate solution should be reduced to the metallic state at a pH of about 8.7. With reduced molal activity ($a=10^{-4}$) the pH required to drive the reductive process forward is considerably higher. An equivalent diagram may be constructed for strong ammoniacal ammonium sulphate solution whereby nickel present as the hexammine complex should be reduced to the metallic state at a pH of about 9.

FIG. 2 illustrates how the process of the present invention may be integrated into an ammoniacal solvent extraction process for the recovery of nickel.

Figure 3:
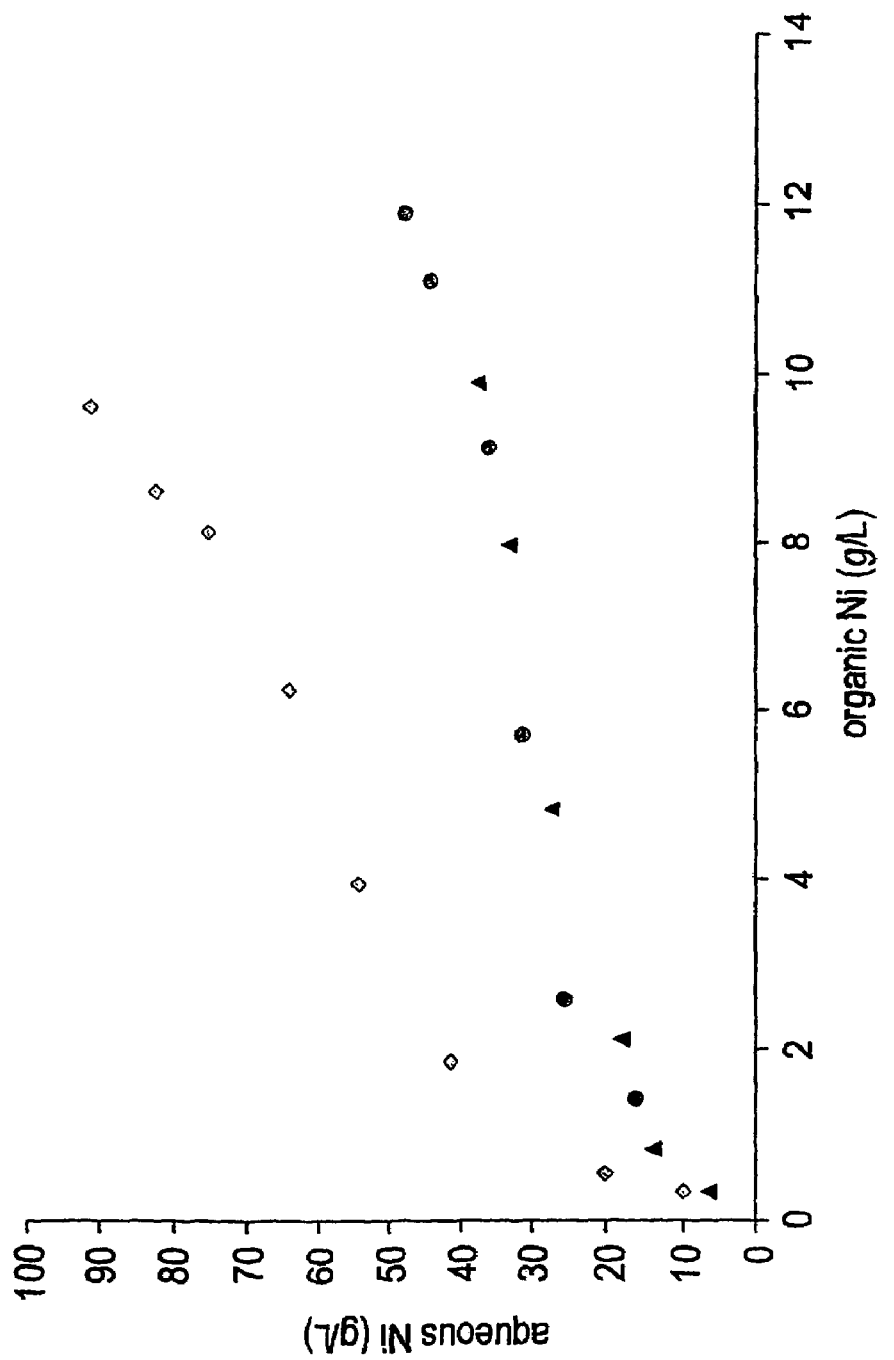

FIG. 3 illustrates strip isotherms for the process described in Example 1 for ASX loaded organic using $NH_3/(NH_4)_2SO_4$ strip liquor; Test 1 (triangle) 194 g/L $NH_3$, 143.1 g/L $SO_4^{2-}$; Test 2 (circle) 196 g/L $NH_3$, A strip isotherm for stripping of loaded organic (12.2 g/L Ni) with $NH_3/(NH_4)_2CO_3$ (diamond) is shown for comparison.

A typical process shown in FIG. 2 illustrates that the method of the invention may be integrated in a nickel solvent extraction process, such as that described in AU 605867. A typical process involves first extracting nickel from an ammoniacal liquor with an organic reagent such as 2-hydroxy-5-t-nonyl acetophenoneoxime, to form a nickel loaded organic phase, and an ammoniacal ammonium carbonate raffinate containing cobalt (not illustrated). The ammoniacal liquor containing nickel and cobalt may have been typically produced in a modified Caron process where reduced laterite nickel ore is treated with an ammonia ammonium carbonate solution to extract the nickel, or by the acid leaching of laterites with dissolution in ammonia ammonium carbonate of a nickel cobalt hydroxide intermediate produced by precipitation from acid sulphate solution.

The nickel loaded organic phase is stripped by contacting the organic phase with a high strength ammoniacal ammonium carbonate solution illustrated as step 1 in FIG. 2. Preferably the ammoniacal ammonium carbonate solution used to strip the nickel, may, for example, contain a total

TABLE 1

| Species | $Ni^{2+}$ | $Ni(NH_3)^{2+}$ | $Ni(NH_3)_2^{2+}$ | $Ni(NH_3)_3^{2+}$ | $Ni(NH_2)_4^{2+}$ | $Ni(NH_3)_5^{2+}$ | $Ni(NH_3)_6^{2+}$ |
|---|---|---|---|---|---|---|---|
| $E^0{}_{Aq}/V$ | −0.25 | | | | | | |
| $E^0{}_c/V$ | | −0.333 | −0.4 | −0.452 | −0.49 | −0.514 | −0.518 |
| Equilibrium p | | | | | | | |
| a = 1 | | 4.25 | 5.65 | 6.8 | 7.65 | 8.3 | 8.7 | 8.77 |
| a = $10^{-4}$ | | 6.25 | 7.65 | 8.77 | 9.65 | 10.3 | 10.7 | 10.8 | ammonia concentration of from 210 to 300 g/L and a total carbon dioxide concentration of from 50 to 300 g/L to form a nickel ammine carbonate complex. Given such concentration of ammonia and carbon dioxide, it is found that nickel will generally form the hexammine carbonate complex.

Hydrogen reduction of this nickel ammine carbonate complex may successfully be integrated into the solvent extraction process where the nickel ammine carbonate complex in solution is recovered from the solvent extraction process (step 2). As illustrated in Table 1 for the hexammine complex, if the pH is maintained at above 8.77, hydrogen will reduce the nickel hexammine carbonate complex to metallic nickel, ammonium carbonate and ammonia as follows:

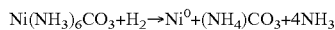

$$Ni(NH_3)_6CO_3 + H_2 \rightarrow Ni^0 + (NH_4)CO_3 + 4NH_3$$

Alternatively, high strength ammoniacal ammonium sulphate solution could be used to strip the organic phase forming a nickel ammine sulphate complex. In the case of hydrogen reduction of the nickel ammine sulphate complex, preferably the ammoniacal ammonium sulphate solution used to strip the nickel, may, for example, contain a total ammonia concentration of from 160 to 300 g/L and a total sulphate concentration of from 50 to 180 g/L to form a nickel ammine sulphate complex. Given the concentration of ammonia in solution, the nickel hexammine sulphate complex will tend to form. Hydrogen reduction of this nickel hexammine sulphate complex may also be successfully integrated into the solvent extraction process where the nickel ammine sulphate complex in solution is recovered from the solvent extraction process, with the reaction as follows:

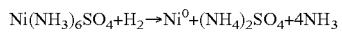

$$Ni(NH_3)_6SO_4 + H_2 \rightarrow Ni^0 + (NH_4)_2SO_4 + 4NH_3$$

The ammonium carbonate or sulphate formed following these reactions may be regenerated and used with or without added ammonia to form an ammoniacal ammonium carbonate or sulphate solution which is used to strip the nickel loaded organic phase as illustrated by step (3).

The metallic nickel recovered by the process is washed and solid nickel is recovered by conventional means such as filtration.

The process of the present invention has found that hydrogen reduction of nickel ammine complexes such as nickel ammine carbonate or nickel ammine sulphate complexes may successfully be integrated into nickel solvent extraction and nickel recovery processes where nickel is in the form of an ammine complex in high strength ammonia solution.

A particular advantage of the invention is that in processes where concentrated ammonia solutions are preferred, such as the stripping of nickel from the organic phase in the modified Caron process, the integration of the hydrogen reduction step together with solvent extraction eliminates a number of otherwise required process steps, and produces a nickel product of high quality.

The following examples are illustrative of the process of the present invention and are not intended to be limiting upon the scope or generality of the process defined herein.

EXAMPLES

Example 1

Test work was conducted in order to investigate whether nickel could be stripped from a typically loaded organic phase produced in a solvent extraction process as described in AU 605867 using a high strength ammoniacal ammonium sulphate strip solution rather than an ammoniacal ammonium carbonate strip solution.

Stripping isotherms generated using strip liquor containing two different sulphate concentrations showed that nickel may be stripped from the loaded organic phase using ammoniacal ammonium sulphate. The nickel loaded organic phase was formed using 2-hydroxy-5-t-nonyl acetophenoneoxime reagent modified by an alcohol in an aliphatic or aromatic kerosene type carrier.

The results for the strip isotherms obtained using the ammoniacal ammonium sulphate strip liquor at two different sulphate concentrations are given in Table 2 and FIG. 3.

TABLE 2

Data obtained for the stripping of loaded ASX organic phase with ammoniacal ammonium sulphate solution at two different sulphate concentrations.

| Isotherm point | Organic Ni (g/L) | Ni (g/L) | $NH_3$ (g/L) | $NH_3$ (g/L) total | $SO_4^{2-}$ (g/L) | pH |
|---|---|---|---|---|---|---|
| Test 1 | | | | | | |
| 1 | 0.320 | 6.52 | 160 | 161 | 123.0* | 10.63 |
| 2 | 0.806 | 13.9 | 176 | 160 | 124.2* | 9.90 |
| 3 | 2.08 | 17.9 | 172 | 177 | 150.3 | |
| 4 | 4.79 | 26.8 | 171 | 169 | 154.5 | 10.44 |
| 5 | 7.96 | 32.8 | 165 | 163 | 159.0 | 10.34 |
| 6 | 9.91 | 37.1 | 159 | 161 | 162.3 | 10.17 |
| Strip Liquor | n/a | n/a | 176 | 194 | 143.1 | 10.57 |
| Loaded organic | 12.8 | n/a | n/a | n/a | n/a | n/a |
| Test 2 | | | | | | |
| 1 | 1.39 | 16.2 | 164 | 161 | 76.59 | |
| 2 | 2.55 | 24.2 | 170 | 186 | 77.79 | 10.75 |
| 3 | 5.68 | 30.9 | 165 | 152 | 80.34 | |
| 4 | 9.13 | 35.5 | 162 | 149 | 85.38 | 11.07 |
| 5 | 11.1 | 44.0 | 147 | 127 | 85.92 | 11.16 |
| 6 | 11.9 | 47.7 | 127 | 105 | 85.83 | |
| Loaded organic | 12.8 | n/a | n/a | n/a | n/a | n/a |

Example 2

This test was carried out to illustrate the concept of integration of the stripping of nickel from the organic phase following an ammoniacal solvent extraction process using a concentrated ammonia ammonium sulphate solution followed by hydrogen reduction to produce nickel metal.

A solution of nickel hexammine sulphate and free ammonia was prepared by dissolving 358.3 g of $NiSO_4 \cdot 6H_2O$ crystals in 641.7 g of 25% w/w aqueous ammonia solution. The solution by calculation contained 80.0 g of Ni and 160.4 g of $NH_3$. This corresponds to a $NH_3$:Ni mole ratio of 6.9:1. A sample was found by assay to contain 94 g/L of Ni. 994 g of this solution was charged into a 2 L batch 316 stainless steel autoclave equipped with a borosilicate glass liner, cooling coils, thermocouple well and agitator. The autoclave was sealed, agitation at 214 rpm started, purged with high purity nitrogen gas and external electrical heating applied to raise the temperature of the solution to 185° C. The total pressure at this point was 320 psi. The temperature was allowed to rise to 200° C. and high purity hydrogen gas was introduced to increase the pressure to 900 psi. These conditions were maintained, with the addition of hydrogen gas at 20 min intervals to return the total pressure to 900 psi.

After 2 hours and 45 minutes no further hydrogen consumption was evident and the pressure no longer was seen to decline with time. After 4 hours heating was stopped and water cooling applied indirectly by means of the cooling coils. After cooling to approximately 40° C. the pressure was let down and the autoclave again purged with nitrogen to displace the remaining hydrogen gas. On opening of the autoclave, precipitated metallic nickel was recovered from the resulting mixture, to a total of 62.3 g, excluding remaining nickel coating the cooling coils, thermocouple well, agitator and shaft. A sample of the final solution was found by assay to contain 5 g/L of Ni, corresponding to a precipitation efficiency of 95%. The $NH_3$:Ni ratio in this solution was therefore approximately 78:1.

Example 3

This test was carried out to illustrate the concept of integration of the stripping of nickel from the organic phase following an ammoniacal solvent extraction process using a concentrated ammonia ammonium carbonate solution followed by hydrogen reduction to produce nickel metal.

A solution of nickel, carbon dioxide and free ammonia was prepared by dissolving 250 g of basic nickel carbonate filter cake (containing 24% Ni by weight) in 868 g of 28% w/w aqueous ammonia solution. The solution by calculation contained 57.6 g of Ni and 243 g of $NH_3$. This corresponds to a theoretical Ni:$NH_3$ mole ratio of 1:14.6. A sample was found by assay to contain 54 g/L of Ni and 190 g/L of ammonia, corresponding to an actual ratio of 1:12.1, Ni:$NH_3$. 984 g of this solution was charged into a 2 L batch 316 stainless steel autoclave equipped with a borosilicate glass liner, cooling coils, thermocouple well and agitator. The ports and pressure gauge were heated to prevent ammonium carbonate scaling. The autoclave was sealed and agitated at 330 rpm. The autoclave was then purged with high purity nitrogen gas and external electrical heating applied to raise the temperature of the solution to 176° C. The total pressure at this point was 440 psi. High purity hydrogen gas was introduced to increase the pressure to 900 psi. Hydrogen gas at 5 min intervals to return the total pressure to 900 psi, and the temperature was controlled in the range 186±4° C. After one hour no further hydrogen consumption was evident and the pressure no longer was seen to decline with time. The heater was turned off and water cooling applied indirectly by means of the cooling coils. After cooling to approximately 40° C. the pressure was let down and the autoclave again purged with nitrogen to displace the remaining hydrogen gas. On opening of the autoclave, precipitated metallic nickel was recovered from the resulting mixture, to a total of 46.0 g, including remaining nickel coating the cooling coils, thermocouple well, agitator and shaft. A sample of the final solution was found by assay to contain 0.3 g/L of Ni, 173 g/L $NH_3$ and 29 g/L $CO_2$, corresponding to a precipitation efficiency of 99%. The $NH_3$:Ni ratio in this solution was therefore approximately 2049:1

The above description illustrates preferred embodiments of the process of the present invention but it should be understood that modifications that do not depart from the spirit or the ambit of the process as defined herein should be considered to form part of the invention as described.

The invention claimed is:

1. An integrated process for the recovery of a metallic nickel product from a solvent extraction process comprising:
    (a) forming a nickel ammine complex substantially as a hexammine complex, by stripping nickel from a nickel loaded organic phase with a high strength ammonia solution selected from the group consisting of an ammoniacal ammonium carbonate solution and a high strength ammoniacal ammonium sulfate solution, wherein following step (a), the molar ratio of ammonia to nickel in the high strength ammoniacal ammonium sulfate solution is greater than 6:1, or the molar ratio of ammonia to nickel in the high strength ammoniacal ammonium carbonate solution is greater than 8:1; and
    (b) reducing the nickel ammine complex from the high strength ammonia solution with hydrogen to produce a metallic nickel product.

2. The integrated process according to claim 1, wherein the nickel ammine complex is a nickel ammine carbonate complex, and the high strength ammonia solution is a high strength ammoniacal ammonium carbonate solution.

3. The integrated process according to claim 1, wherein the nickel ammine complex is a nickel ammine sulfate complex, and the high strength ammonia solution is a high strength ammoniacal ammonium sulfate solution.

4. The integrated process according to claim 1, wherein the organic phase is formed in the solvent extraction process, whereby an organic reagent is used to extract nickel ions from an ammoniacal ammonium carbonate liquor to form the organic phase.

5. The integrated process according to claim 4, wherein the organic reagent is selected from 2-hydroxy-5-t-nonyl-acetophenoneoxime, 2-hydroxy-5-t-nonyl-salicylaldoxime, and alkyl, aryl and halide substituted beta diketone types.

6. The integrated process according to claim 5, wherein the organic reagent is a 2-hydroxy-5-t-nonyl-acetophenone-oxime modified by an alcohol in an aliphatic or aromatic kerosene type carrier or a combination of both.

7. The integrated process according to claim 4, wherein the nickel exists as a nickel II ion in the ammoniacal ammonium carbonate liquor prior to being extracted with the organic reagent.

8. The integrated process according to claim 2, wherein the high strength ammoniacal ammonium carbonate solution used to strip the organic phase has an ammonia concentration of about 210 to 300 g/L and a carbon dioxide concentration of about 50 to 150 g/L.

9. The integrated process according to claim 8, wherein the high strength ammoniacal ammonium carbonate solution has an ammonia concentration of about 260 g/L.

10. The integrated process according to claim 9, wherein the high strength ammoniacal ammonium carbonate solution after the nickel has been stripped from the organic phase contains 50 to 90 g/L nickel as the nickel carbonate hexammine complex.

11. The integrated process according to claim 3, wherein the high strength ammoniacal ammonium sulfate solution used to strip the organic phase has an ammonia concentration of about 160 to 300 g/L and sulfate concentration of about 50 to 180 g/L.

12. The integrated process according to claim 11, wherein the high strength ammoniacal ammonium sulfate solution has an ammonia concentration of about 160-200 g/L and a sulfate concentration of about 70 to 160 g/L.

13. The integrated process according to claim 12, wherein the high strength ammoniacal ammonium sulfate solution, after the nickel has been stripped from the organic phase, contains 30 to 60 g/L nickel as the nickel sulphate sulfate hexammine complex.

14. The integrated process according to claim 2, wherein the reaction product of the hydrogen reduction of the nickel hexammine carbonate complex is metallic nickel, ammonium carbonate and ammonia.

15. The integrated process according to claim 3, wherein the reaction product of the nickel hexammine sulfate complex is a metallic nickel, ammonium sulfate and ammonia.

16. The integrated process of claim 1, wherein (b) reducing the nickel ammine complex comprises reducing the nickel ammine complex directly from the high strength ammonia solution with hydrogen to produce the metallic nickel product.

17. The integrated process according to claim 9, wherein the high strength ammoniacal ammonium carbonate solution after the nickel has been stripped from the organic phase contains 50 to 90 g/L nickel substantially as the nickel carbonate hexammine complex.

18. The integrated process according to claim 12, wherein the high strength ammoniacal ammonium sulfate solution, after the nickel has been stripped from the organic phase, contains 30 to 60 g/L nickel substantially as the nickel sulfate hexammine complex.

19. An integrated process for the recovery of a metallic nickel product from a solvent extraction process consisting essentially of:
  (a) forming a nickel ammine complex substantially as a hexammine complex, by stripping nickel from a nickel loaded organic phase with a high strength ammonia solution selected from the group consisting of an ammoniacal ammonium carbonate solution and a high strength ammoniacal ammonium sulfate solution, wherein following step (a), the molar ratio of ammonia to nickel in the high strength ammoniacal ammonium sulfate solution is greater than 6:1, or the molar ratio of ammonia to nickel in the high strength ammoniacal ammonium carbonate solution is greater than 8:1; and
  (b) reducing the nickel ammine complex from the high strength ammonia solution with hydrogen to produce a metallic nickel product.

20. An integrated process for the recovery of a metallic nickel product from a solvent extraction process consisting of:
  (a) forming a nickel ammine complex substantially as a hexammine complex, by stripping nickel from a nickel loaded organic phase with a high strength ammonia solution selected from the group consisting of an ammoniacal ammonium carbonate solution and a high strength ammoniacal ammonium sulfate solution, wherein following step (a), the molar ratio of ammonia to nickel in the high strength ammoniacal ammonium sulfate solution is greater than 6:1, or the molar ratio of ammonia to nickel in the high strength ammoniacal ammonium carbonate solution is greater than 8:1; and
  (b) reducing the nickel ammine complex from the high strength ammonia solution with hydrogen to produce a metallic nickel product.

* * * * *